(12) United States Patent
Lee (10) Patent No.: US 8,665,834 B2
(45) Date of Patent: Mar. 4, 2014

(54) METHOD AND APPARATUS FOR TRANSCEIVING DATA USING DIRECTIONAL BEAM IN WIRELESS PERSONAL AREA NETWORK

(75) Inventor: Jae-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 12/988,153

(22) PCT Filed: Dec. 1, 2008

(86) PCT No.: PCT/KR2008/007051
§ 371 (c)(1),
(2), (4) Date: Oct. 15, 2010

(87) PCT Pub. No.: WO2009/128599
PCT Pub. Date: Oct. 22, 2009

(65) Prior Publication Data
US 2011/0032881 A1 Feb. 10, 2011

(30) Foreign Application Priority Data
Apr. 15, 2008 (KR) .................. 10-2008-0034660

(51) Int. Cl.
*H04W 4/00* (2009.01)
*H04B 7/212* (2006.01)

(52) U.S. Cl.
USPC ........................ 370/334; 370/337; 370/347

(58) Field of Classification Search
USPC .................... 370/329, 334, 337, 347
See application file for complete search history.

(56) References Cited

U.S. PATENT DOCUMENTS

| | | | |
|---|---|---|---|
| 2003/0152083 A1* | 8/2003 | Nagata et al. ............ 370/395.4 |
| 2005/0176468 A1* | 8/2005 | Iacono et al. ............ 455/562.1 |
| 2006/0009244 A1* | 1/2006 | Schacht et al. ............ 455/500 |
| 2006/0052139 A1* | 3/2006 | Teo et al. ............ 455/562.1 |
| 2006/0073850 A1 | 4/2006 | Cha et al. |
| 2006/0264184 A1* | 11/2006 | Li et al. ............ 455/101 |
| 2007/0121751 A1 | 5/2007 | Li et al. |
| 2007/0127378 A1* | 6/2007 | Yang et al. ............ 370/235 |
| 2009/0111381 A1* | 4/2009 | Johnson et al. ............ 455/63.4 |
| 2009/0238156 A1* | 9/2009 | Yong et al. ............ 370/336 |
| 2010/0210219 A1* | 8/2010 | Stirling-Gallacher et al. ............ 455/67.11 |

OTHER PUBLICATIONS

Fittipaldi, D.A., et al., "IEEE 802.15.3C Medium Access Controller Throughput for Phased Array Systems", 18th Annual IEEE International Symposium on Personal, Indoor and Mobile Radio Communications, 2007, pp. 1-5.
International Search Report for PCT/KR2008/007051 issued Mar. 20, 2009 [PCT/ISA/210].
Written Opinion for PCT/KR2008/007051 issued Mar. 20, 2009 [PCT/ISA/237].

* cited by examiner

*Primary Examiner* — Andrew Lee
(74) *Attorney, Agent, or Firm* — Sughrue Mion, PLLC (57) ABSTRACT

Provided are a method and apparatus for data communication in a wireless personal area network (WPAN) using directional beams, the method including: setting priorities to a plurality of beam paths capable of establishing a link between a first device and a second device; generating a list of the beam paths to which the priorities are set; and establishing a link between the first device and the second device with reference to the generated list. Accordingly, time and wireless resources for restoring the link can be minimized.

17 Claims, 6 Drawing Sheets

METHOD AND APPARATUS FOR TRANSCEIVING DATA USING DIRECTIONAL BEAM IN WIRELESS PERSONAL AREA NETWORK

CROSS-REFERENCE TO RELATED PATENT APPLICATION

This application is a National Stage application under 35 U.S.C. §371 of PCT/KR2008/007051 filed on Dec. 1, 2008, which claims priority from Korean Patent Application No. 10-2008-0034660, filed on Apr. 15, 2008 in the Korean Intellectual Property Office, all the disclosures of which are incorporated herein in their entireties by reference.

BACKGROUND

1. Field

Apparatuses and methods consistent with exemplary embodiments relate to a wireless personal area network (WPAN), and more particularly, to transceiving data between devices in the WPAN using directional beams.

2. Description of the Related Art

A wireless personal area network (WPAN) is a wireless network in which devices arranged at short distances from one another transceive data at low power. In a WPAN, data communication is performed using a time division multiple access (TDMA) method. Accordingly, devices desiring to perform data communication occupy a channel exclusively for a channel time allocation period (CTAP), which is allocated by a device referred to as a Piconet coordinator (PNC), to perform data communication. Further description on WPAN is disclosed in IEEE 802.15 family standard documents, and will therefore be omitted here.

Recently, studies on a high speed data transmission technology using a millimeter (mm)-wave, which is a high frequency wave having a short wavelength of 1-10 mm and high directivity, are ongoing. For example, an IEEE 802.15.3c Task Group is working on standardization of a physical layer (PHY) for data communication using an mm-wave in a WPAN. As described above, mm-wave is a high frequency wave having a short wavelength of 1-10 mm and high directivity, and can be used for transmission of large capacities of data (such as high definition (HD) quality moving images) in a home network.

Figure 1:
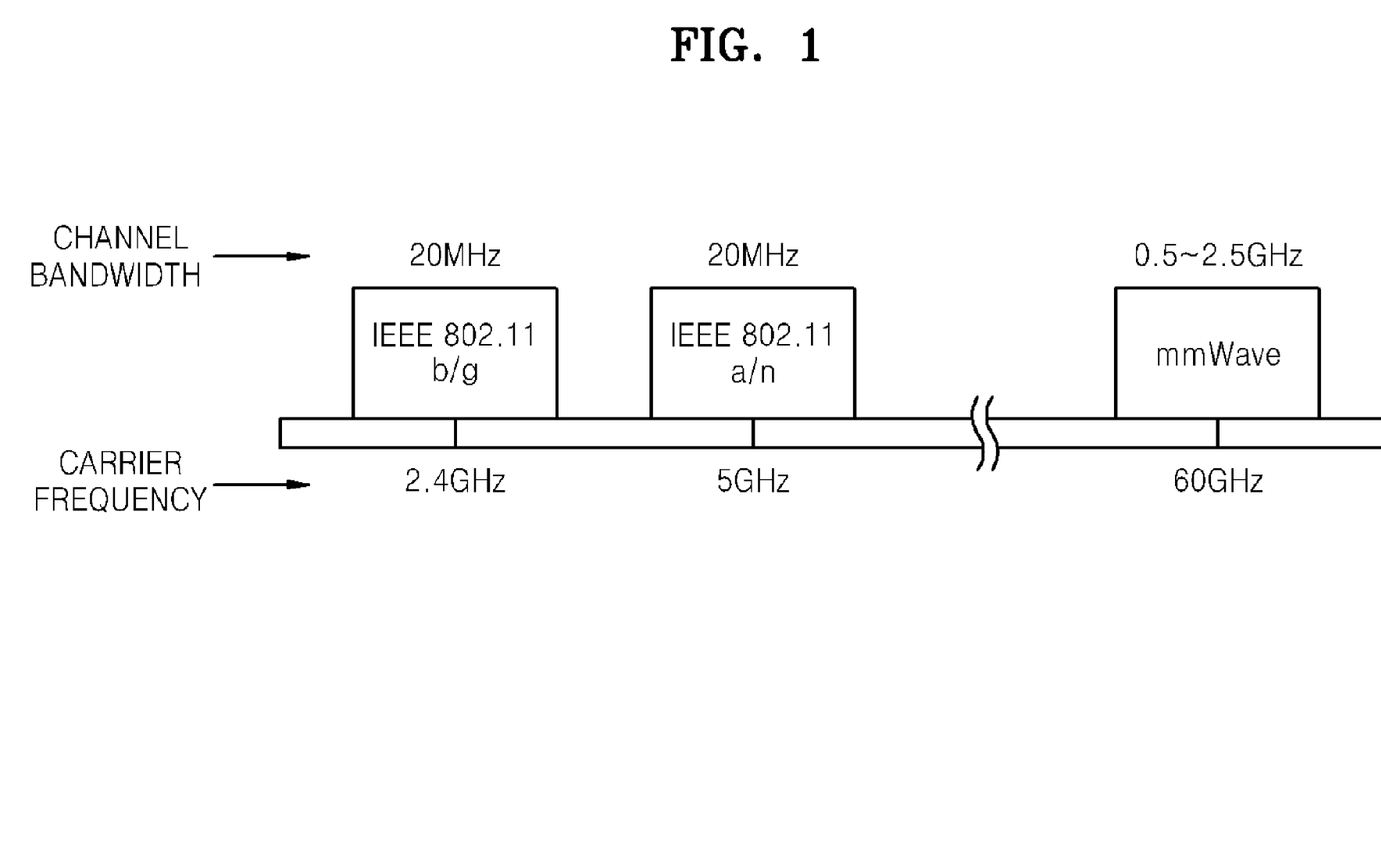
FIG. 1 is a schematic view for comparing frequency bands used in communication according to IEEE 802.11 family standard and in communication using an mm-wave.

FIG. 1 is a schematic view for comparing frequency bands used in data communication according to IEEE 802.11 family standards and in communication using an mm-wave.

As illustrated in FIG. 1, the carrier frequency of IEEE 802.11b standard or IEEE 802.11 g standard is 2.4 GHz and the channel bandwidth thereof is about 20 MHz. Also, the carrier frequency of IEEE 802.11a standard or IEEE 802.11n standard is 5 GHz and the channel bandwidth thereof is also about 20 MHz. In contrast, an mm-wave uses a carrier frequency of 60 GHz and has a channel bandwidth of about 0.5 to 2.5 GHz. As described above, an mm-wave has significantly larger carrier frequency and channel bandwidth in comparison to the IEEE 802.11 family standards. Thus, by using an mm-wave, a high transmission rate of several Gbps can be obtained, the size of an antenna can be kept to 1.5 mm or less, and a single chip including an antenna can be realized. Also, since attenuation in air is high, interference between devices can also be reduced.

Figure 2:
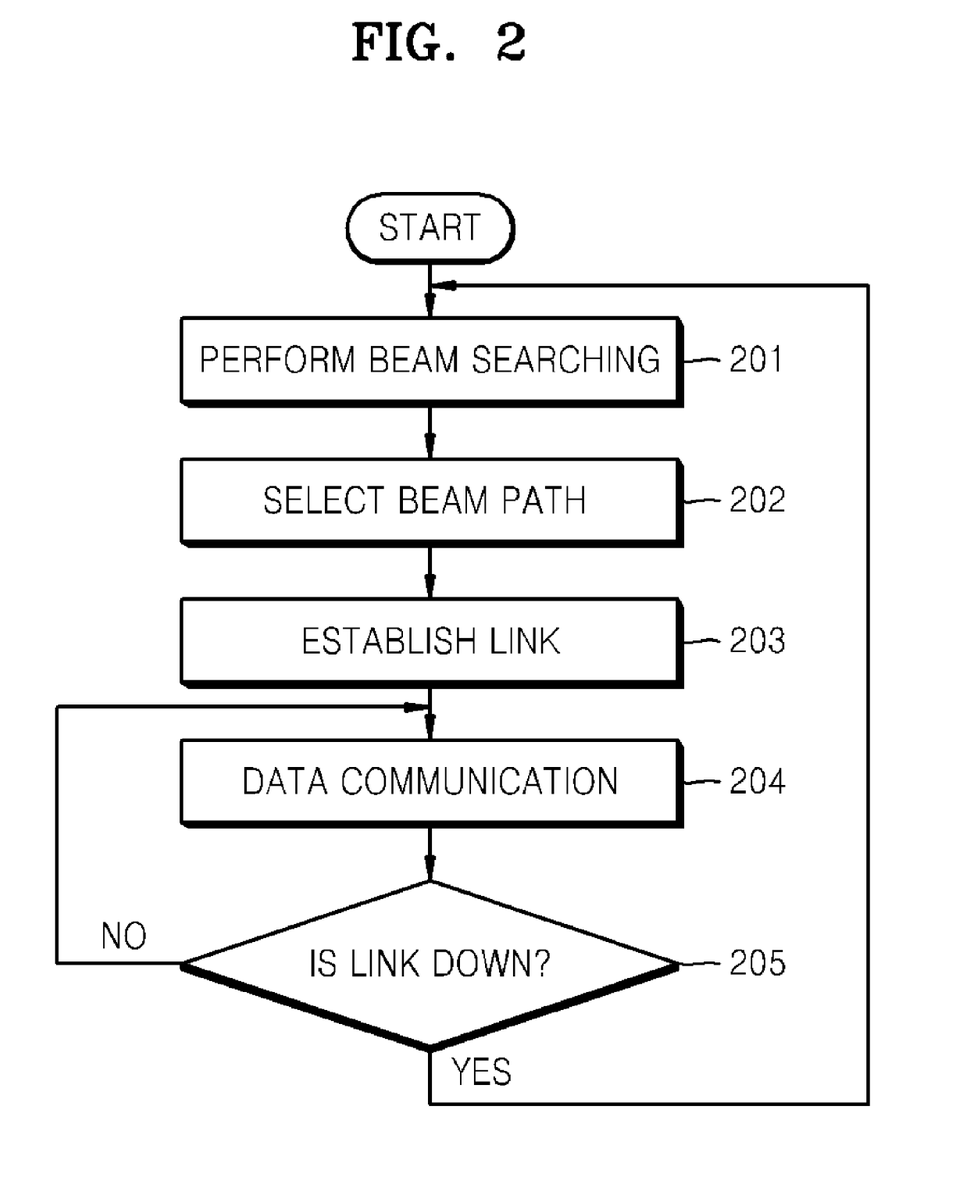
FIG. 2 is a flowchart illustrating a related art process of performing data communication between devices using an mm-wave in a WPAN.

FIG. 2 is a flowchart illustrating a related art process of performing data communication between devices using an mm-wave in a WPAN.

Referring to FIG. 2, in operation 201, a transmitter device and a receiver device perform beam searching. Since directional beams are used in data communication using an mm-wave, various beam paths may be present, wherein these beam paths can establish a link between the transmitter device and the receiver device. Beam searching is a process of searching for various beam paths.

In operation 202, an optimum beam path to be used for establishing a link is selected among the discovered beam paths. For example, a beam path having a largest receiving signal strength in the receiver device may be selected.

In operation 203, the transmitter device and the receiver device establish a link using the selected beam path.

In operation 204, the transmitter device and the receiver device perform data communication using the link. As described above, directional beams are used to perform data communication.

In operation 205, the transmitter and receiver devices judge whether the link for data communication is down. If the link is down, beam searching is performed again to restore the link between the devices using a new beam path.

Figure 3:
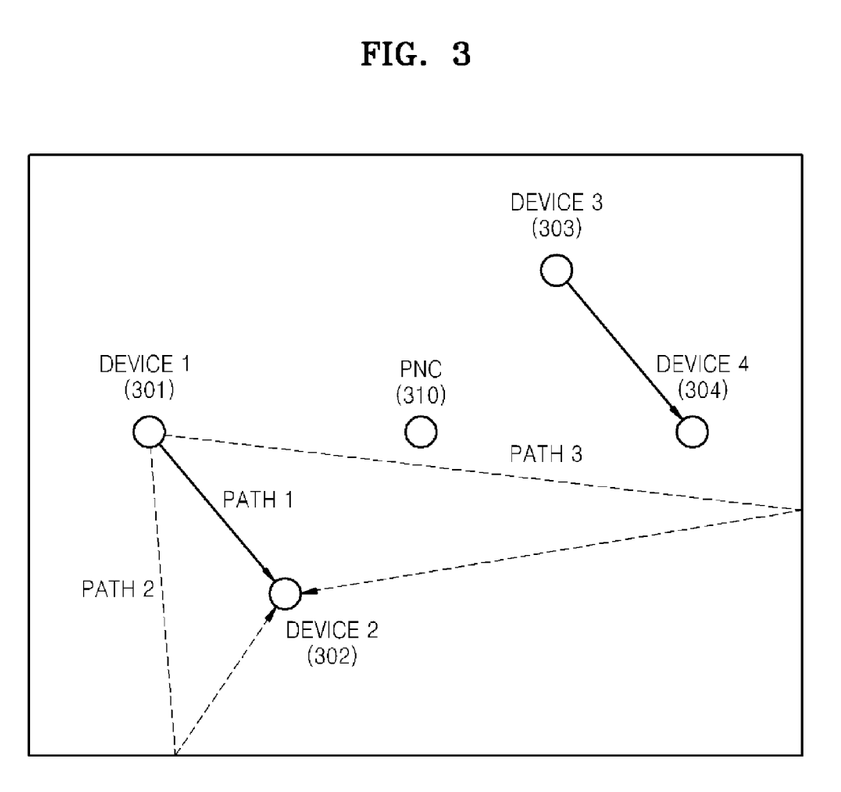
FIG. 3 is a schematic view for explaining a related art data communication method performed by a WPAN device using an mm-wave.

FIG. 3 is a schematic view for explaining a related art data communication method performed by a WPAN device using an mm-wave.

As illustrated in FIG. 3, a Piconet coordinator (PNC) 310, a device 1 301, a device 2 302, a device 3 303, and a device 4 304 are included in a WPAN.

The device 1 301 desires to transmit data to the device 2 302, and the device 3 303 desires to transmit data to the device 4 304. Accordingly, the device 1 301 and the device 3 303 request the PNC 310 for a wireless resource allocation, and the PNC 310 allocates a channel time allocation period (CTAP) to the device 1 301 and the device 3 303.

The device 1 301 and the device 2 302 perform data communication during a CTAP that is allocated to them. First, the devices 301 and 302 perform beam searching to find a beam path in which to establish a link. The device 1 301 selects a path 1, among the paths found by the beam searching, to perform data communication.

If an obstacle blocks a beam path during data communication using a directional beam such as an mm-wave, it is likely that data communication will be interrupted at the same time as a link goes down. Thus, when an obstacle blocks a path 1, the device 1 301 and the device 2 302 search for beam paths again and find a path 2 and a path 3. Accordingly, the devices 301 and 302 restore the link using an optimum beam path among the found beam paths according to receiving signal strengths.

According to a related art, when the link has gone down because of, for example, an obstacle blocking beam paths in a WPAN in which data communication is performed using directional beams, the devices search for beam paths again, and compare the reception signal intensities of the found beam paths to find an optimum beam path. Thus, a large amount of time and resources are consumed to restore the link. Moreover, when selecting an optimum path among the various beam paths, if another factor besides the receiving signal strength is to be taken into consideration, the above problem becomes more serious and complex.

SUMMARY

One or more exemplary embodiments provide a method and apparatus for restoring a link when a link between devices in a wireless personal area network (WPAN) goes down, using reduced time and resources.

According to an aspect of an exemplary embodiment, there is provided a data communication method for a first device in a wireless personal area network (WPAN) using directional beams, the method including: setting priorities to a plurality of beam paths capable of establishing a link between the first device and a second device; generating a list of the beam paths to which the priorities are set; and establishing a link between the first device and the second device with reference to the generated list.

The establishing the link may include establishing the link using a beam path of a next highest priority in the list when a link currently being used for data communication is down.

In the setting the priorities, the priorities may be set with reference to whether interference is generated by the beam paths in data communication between a third device and a fourth device, and the data communication between the third device and the fourth device may be performed by sharing a channel time allocation period (CTAP) with the first device and the second device.

The data communication may be performed using a millimeter wave.

According to an aspect of another exemplary embodiment, there is provided a computer readable recording medium having embodied thereon a computer program for executing the above-described method.

According to an aspect of another exemplary embodiment, there is provided an apparatus for data communication performed by a first device in a wireless personal area network (WPAN) using directional beams, the apparatus including: a priority setting unit which sets priorities to a plurality of beam paths capable of establishing a link between the first device and a second device; a list generating unit which generates a list of the beam paths to which the priorities are set; and a link establishing unit which establishes a link between the first device and the second device with reference to the generated list.

According to an aspect of another exemplary embodiment, there is provided a data communication method for a first device in a wireless personal area network (WPAN) using directional beams, the method including: when an established link using a first beam path between the first device and a second device is down, establishing another link between the first device and the second device using a second beam path having a next highest set priority, as compared to the first beam path, with reference to a generated list of beam paths to which priorities are set.

DETAILED DESCRIPTION OF EXEMPLARY EMBODIMENTS

Exemplary embodiments will now be described more fully with reference to the accompanying drawings, in which like reference numerals refer to like elements throughout. Furthermore, expressions such as "at least one of," when preceding a list of elements, modify the entire list of elements and do not modify the individual elements of the list.

Figure 4:
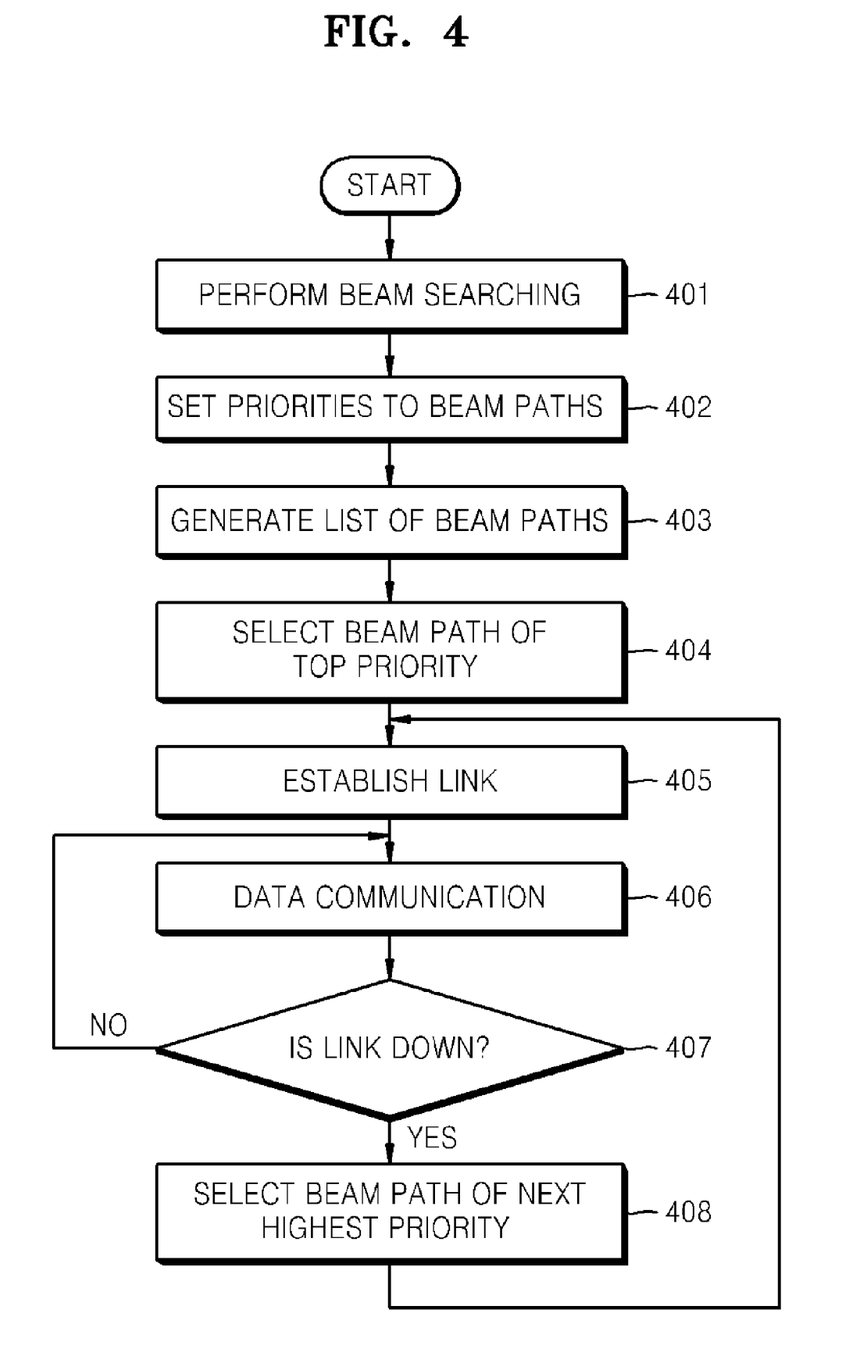
FIG. 4 is a flowchart illustrating a data communication method of a WPAN device according to an exemplary embodiment.

FIG. 4 is a flowchart illustrating a data communication method of a wireless personal area network (WPAN) device according to an exemplary embodiment.

Referring to FIG. 4, in operation 401, devices, i.e., transmitter and receiver devices, perform beam searching to search for beam paths to establish a link.

In operation 402, the devices set priorities to found beam paths. For example, at least one of receiving signal strengths, whether interference with other devices occurs (e.g., when spatial reuse is applied), and the like may be referred to when setting the priorities. The case where spatial reuse is applied will be described in detail later with reference to FIG. 5.

In operation 403, the devices generate a list of beam paths to which the priorities are set.

In operation 404, the devices select a beam path having a highest priority with reference to the list of the beam paths.

In operation 405, the devices establish a link for data communication using the beam path selected in operation 404.

In operation 406, the devices perform data communication using directional beams using the link established in operation 405.

In operation 407, the devices judge whether the link is down. A link that is down refers to a link via which data communication is not possible anymore.

In operation 408, the devices select a beam path of a next highest priority with reference to the list generated in operation 403, and restore the link using the selected beam path of the next highest priority.

Thus, unlike the related art, a list is generated using information on the beam paths obtained in a prior beam path search. Moreover, when the link goes down during data communication, the link is restored using a beam path of a next priority instead of searching for beam paths again. Accordingly, time and resources for performing subsequent beam path searches are not required.

Figure 5:
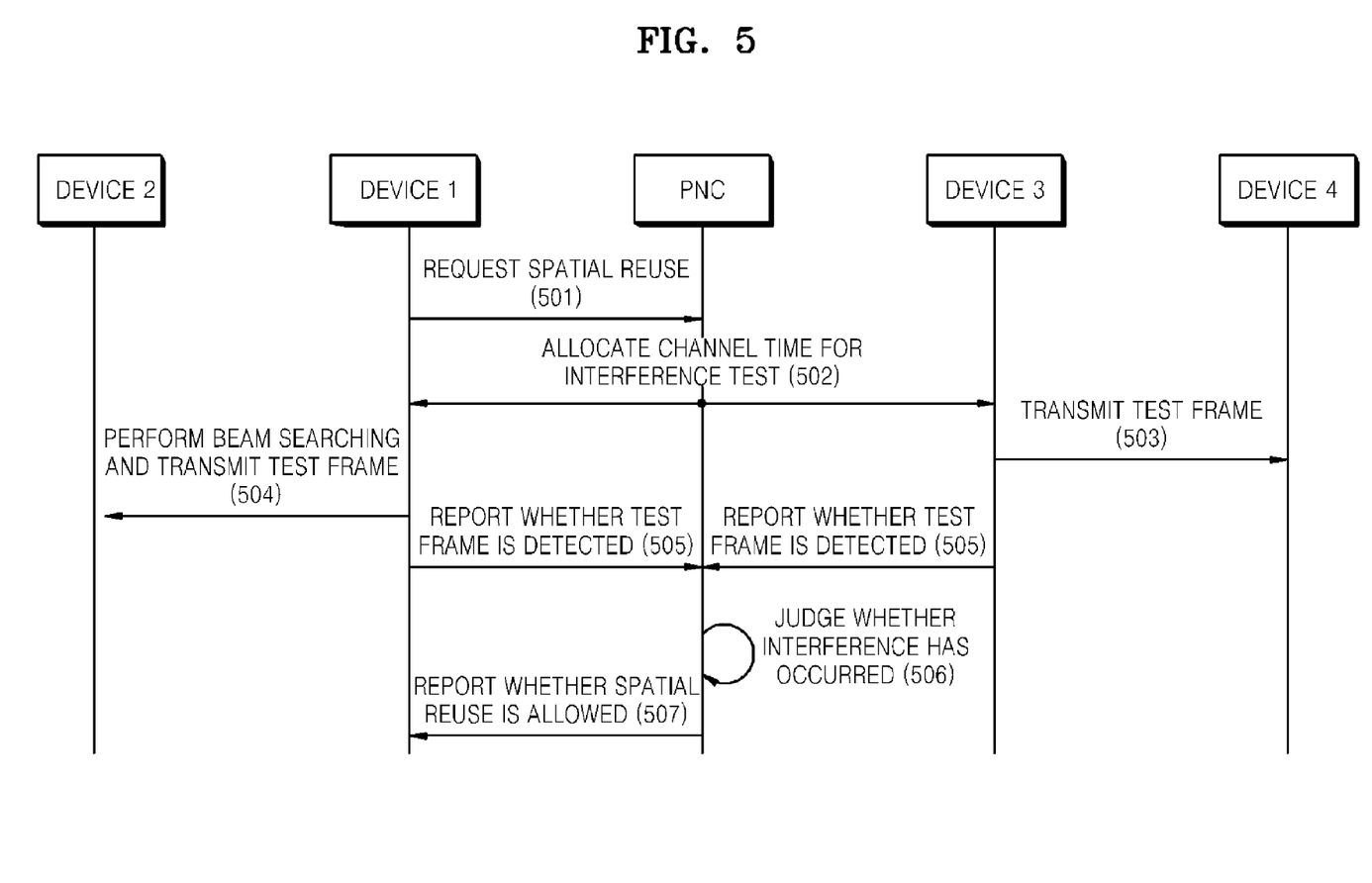
FIG. 5 is a flowchart illustrating a data communication method by spatial reuse according to an exemplary embodiment.

FIG. 5 is a flowchart illustrating a data communication method by spatial reuse according to an exemplary embodiment.

As in the WPAN using an mm-wave, in a wireless network using a time division multiple access (TDMA) method of data communication using directional beams, even when data communication is performed at the same time using two or more links according to the spatial position of the devices, interference may not occur. Thus, if no interference occurs, four or more devices can transceive data by sharing a channel time allocation period (CTAP). Such a data communication method is referred to as spatial reuse.

However, according to the spatial reuse communication method, beam paths are to be selected such that no interference occurs between links, as described above. FIG. 5 illustrates a process of examining whether interference is generated according to an exemplary embodiment.

Referring to FIG. 5, in operation 501, a device 1 requests a network coordinator, such as a Piconet coordinator (PNC), for spatial reuse to transmit data to a device 2. When spatial reuse is requested, a control channel may be used. A control channel is a channel for transmitting and receiving various control signals, different from a channel used for data communication, and uses an omni-directional signal instead of a directional beam.

In operation 502, the PNC allocates to a portion of a super frame a channel time for an interference test in order to judge whether interference occurs when the device 1 transmits data to the device 2 while a device 3 transmits data to a device 4, that is, whether the device 1 and the device 3 may share a CTAP. This allocation of the interference test channel time can be made known to all devices in the WPAN via a beacon frame.

In operation 503, the device 3 transmits a test frame to the device 4 using a directional beam.

In operation 504, the device 1 performs beam searching, and transmits a test frame to the device 2 using found beam paths. Here, index information or an identifier for each of the beam paths may be included in the test frame.

In operation 505, a PNC receives a report from the device 1 and the device 3 on whether a test frame has been detected or not. That is, the device 1 reports to the PNC whether the device 1 has detected the test frame transmitted by the device 3 to the device 4. Also, the device 3 reports to the PNC whether the device 3 has detected the test frame transmitted by the device 1 to the device 2. In detail, index information or an identifier of a beam path may be provided to the PNC to report that the test frame has been detected when the test frame is transmitted through a certain beam path and to indicate a quality of the beam path.

In operation 506, the PNC judges whether interference occurs between the two links. If a test frame transceived in one link is sensed by the other link, the PNC determines that interference has occurred.

In operation 507, the PNC informs the device 1 of the result of the interference test based on the judgment in operation 506, that is, whether spatial reuse is allowed. Index information or an identifier of a beam path to which no interference is generated can be provided. Although not illustrated in the drawing, the device 1 may determine priorities of beam paths with reference to the interference test result and may generate a list of the beam paths.

As such, when spatial reuse is applied, the devices consider the receiving signal strength and the interference. According to the present exemplary embodiment, even when the link goes down, the link can be restored using a beam path of a next highest priority from the list of the beam paths, without having to perform operations 501 through 507 again. Thus, time and resources used for restoring the link are minimal.

Figure 6:
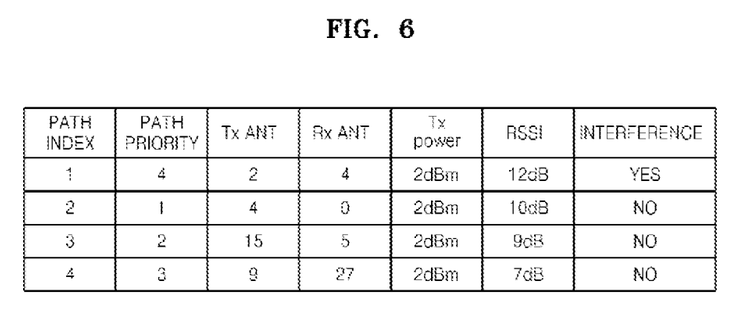
FIG. 6 is a list of beam paths generated by a WPAN device according to an exemplary embodiment.

FIG. 6 is a list of beam paths generated by a WPAN device according to an exemplary embodiment.

As shown in FIG. 6, four beam paths are found, and receiving signal strength indicators (RSSI) of the beam paths are in the order of No. 1, 2, 3, and 4.

However, the beam path No. 1 has the lowest priority despite having the highest RSSI because interference has occurred in its interference test. For example, in the present exemplary embodiment, the result of the interference test is given more deference than the RSSI when spatial reuse is applied.

Here, Tx ANT and Rx ANT are information on beam forming, and beam forming refers to adjustment of a direction of an antenna such that the transmitter device and the receiver device can precisely transmit and receive directional beams.

Figure 7:
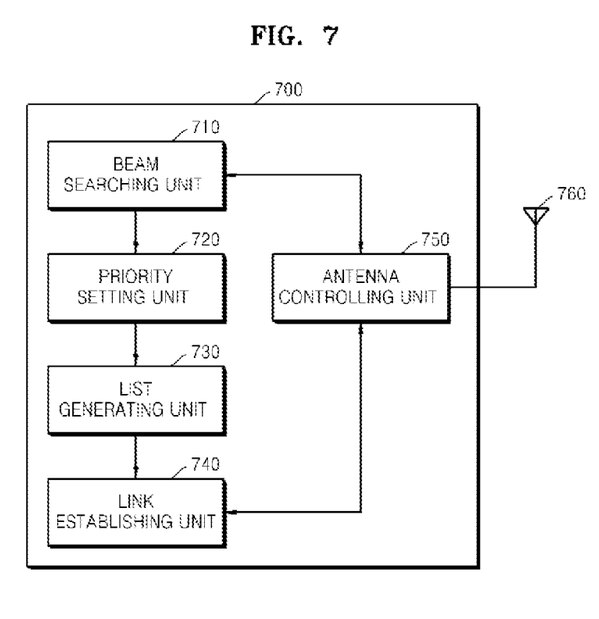
FIG. 7 is a schematic view of a device performing data communication in a WPAN according to an exemplary embodiment.

FIG. 7 is a schematic view of a device 700 performing data communication in a WPAN according to an exemplary embodiment.

As illustrated in FIG. 7, a WPAN device 700 includes a beam searching unit 710, a priority setting unit 720, a list generating unit 730, a link establishing unit 740, an antenna controlling unit 750, and an antenna 760.

The beam searching unit 710 searches for beam paths that may be used for data communication. Since directional beams are used, various beam paths may be found.

The priority setting unit 720 sets priorities to the beam paths searched by the beam searching unit 710. As described above, various factors such as an RRSI, a result of an interference test, etc., can be taken into consideration.

The list generating unit 730 generates a list of beam paths to which priorities are set. An example of the list is shown in FIG. 6.

The link establishing unit 740 forms a link using a beam of a highest priority with reference to the list of the beam paths generated by the list generating unit 730. When a link is down during data communication, the link establishing unit 740 restores the link using a beam path of a next highest priority from the list.

The antenna controlling unit 750 controls the antenna 760 according to a command of the beam searching unit 710 or the link establishing unit 740. The antenna 760 may be able to transmit and receive directional beams in various directions. The antenna 760 may be a sectorized antenna or an array antenna.

While not restricted thereto, one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Furthermore, exemplary embodiments may be written as computer programs transmitted over a computer-readable transmission medium, such as carrier waves (e.g., transmission through the Internet), and received and implemented in general-use or special-purpose digital computers that execute the programs.

According to exemplary embodiments, time and wireless resources used for restoring a link can be minimized even when a link goes down during data communication in a WPAN using directional beams. For example, when spatial reuse is applied, there is no need to conduct interference test procedures every time a link goes down.

While exemplary embodiments have been particularly shown and described with reference to the drawings, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

The invention claimed is:

1. A data communication method for a first device in a wireless personal area network (WPAN) using directional beams, the method comprising:
   setting priorities to a plurality of beam paths capable of establishing a link between the first device and a second device;

generating a list of the beam paths to which the priorities are set; and establishing a link between the first device and the second device with reference to the generated list, the established link being for a data communication, wherein a data communication between a third device and a fourth device is performed by sharing a channel time allocation period (CTAP) with the first device and the second device.

2. The method of claim 1, wherein the establishing the link comprises establishing the link using a beam path of a next highest priority in the list, in comparison to a current beam path, when a link currently being used for the data communication using the current beam path is down.

3. The method of claim 1, wherein:
the setting the priorities comprises setting the priorities with reference to whether interference is generated by the beam paths in a data communication between the third device and the fourth device.

4. The method of claim 1, wherein the data communication is performed using a millimeter wave.

5. A non-transitory computer readable recording medium having recorded thereon a computer program for executing the method of claim 1.

6. The method of claim 1, wherein the establishing the link comprises establishing the link using a beam path having a highest set priority with reference to the generated list.

7. The method of claim 6, further comprising, when the established link is down, establishing another link using another beam path having a next highest set priority, as compared to the beam path having the highest set priority, with reference to the generated list.

8. The method of claim 1, further comprising:
searching, by the first device, for the plurality of beam paths capable of establishing the link between the first device and the second device,
wherein the setting the priorities comprises setting the priorities to the plurality of beam paths found in the searching.

9. The method of claim 1, wherein the setting the priorities comprises setting the priorities with reference to at least one of a received signal strength and an interference for each of the plurality of beam paths.

10. The method of claim 1, wherein the setting the priorities and the generating the list are performed by the first device.

11. An apparatus for data communication performed by a first device in a wireless personal area network (WPAN) using directional beams, the apparatus comprising:

a priority setting unit which sets priorities to a plurality of beam paths capable of establishing a link between the first device and a second device;

a list generating unit which generates a list of the beam paths to which the priorities are set; and a link establishing unit which establishes a link between the first device and the second device with reference to the generated list, the established link being for a data communication, wherein a data communication between a third device and a fourth device is performed by sharing a channel time allocation period (CTAP) with the first device and the second device.

12. The apparatus of claim 11, wherein, when a link currently being used for the data communication using a current beam path is down, the link establishing unit establishes the link using a beam path of a next highest priority in the list, in comparison to the current beam path.

13. The apparatus of claim 11, wherein:
the priority setting unit sets priorities by referring to whether interference is generated by the beam paths in a data communication between the third device and the fourth device.

14. The apparatus of claim 11, wherein the data communication is performed using a millimeter wave.

15. A data communication method for a first device in a wireless personal area network (WPAN) using directional beams, the method comprising:
when an established link using a first beam path between the first device and a second device is down, establishing another link between the first device and the second device using a second beam path having a next highest set priority, as compared to the first beam path, with reference to a generated list of beam paths to which priorities are set,
wherein a data communication between a third device and a fourth device is performed by sharing a channel time allocation period (CTAP) with the first device and the second device.

16. A non-transitory computer readable recording medium having recorded thereon a computer program for executing the method of claim 15.

17. The method of claim 1, wherein the setting the priorities comprises setting the priorities with reference to whether interference is generated by the beam paths in a data communication between a third device and a fourth device.

* * * * *